(12) United States Patent
Honea

(10) Patent No.: US 6,772,532 B1
(45) Date of Patent: Aug. 10, 2004

(54) DISPOSABLE TAPE MEASURE SYSTEM

(76) Inventor: Richard Honea, Pmb 15134, 251 Rainbow Dr., Livingston, TX (US) 77399-2051

( * ) Notice: Subject to any disclaimer, the term of this patent is extended or adjusted under 35 U.S.C. 154(b) by 0 days.

(21) Appl. No.: 09/580,993

(22) Filed: May 27, 2000

(51) Int. Cl.[7] ................................................ G01B 3/10
(52) U.S. Cl. ......................................... 33/759; 33/494
(58) Field of Search ............................. 33/494, 679.1, 33/755, 757, 759, 771, 483, 492, 493

(56) References Cited

U.S. PATENT DOCUMENTS

| | | | | |
|---|---|---|---|---|
| 202,610 A | * | 4/1878 | Ward ............................ | 33/771 |
| 902,306 A | * | 10/1908 | Leahy .......................... | 33/757 |
| 940,873 A | * | 11/1909 | Hanrath ........................ | 33/771 |
| 2,313,920 A | * | 3/1943 | Campbell ..................... | 33/755 |
| 2,994,958 A | * | 8/1961 | Beeber ......................... | 33/771 |
| 4,149,320 A | * | 4/1979 | Troyer et al. .............. | 33/137 R |
| 4,255,867 A | * | 3/1981 | Taylor ......................... | 33/464 |
| 4,970,797 A | * | 11/1990 | Sarasin ........................ | 33/494 |
| 4,974,331 A | * | 12/1990 | Watterson .................. | 33/514.2 |
| 5,107,601 A | * | 4/1992 | Semchuck ................... | 33/759 |
| 5,230,158 A | * | 7/1993 | Wall ............................ | 33/759 |
| 5,251,382 A | * | 10/1993 | Hellar ......................... | 33/759 |
| 5,335,421 A | * | 8/1994 | Jones, Jr. ..................... | 33/494 |
| 5,496,070 A | * | 3/1996 | Thompson ..................... | 283/2 |
| 5,501,019 A | * | 3/1996 | Concari et al. ............ | 33/679.1 |
| 5,666,737 A | * | 9/1997 | Ryan, III ..................... | 33/759 |
| 5,746,001 A | * | 5/1998 | Fisher ......................... | 33/484 |
| 5,771,598 A | * | 6/1998 | Lassberg ..................... | 33/494 |
| 5,894,677 A | * | 4/1999 | Hoffman ...................... | 33/759 |
| RE37,212 E | * | 6/2001 | Marshall ...................... | 33/759 |
| 6,243,963 B1 | * | 6/2001 | Jones et al. ................. | 33/663 |
| 6,530,159 B2 | * | 3/2003 | Tarver, III .................. | 33/759 |

FOREIGN PATENT DOCUMENTS

| | | | | |
|---|---|---|---|---|
| DE | 3503779 | * | 8/1986 | ................ 33/771 |
| FR | 1281647 | * | 12/1961 | ................ 33/771 |
| GB | 0001842 | * | 5/1878 | ................ 33/771 |
| JP | 405005601 A | * | 1/1993 | ................ 33/755 |

* cited by examiner

*Primary Examiner*—Gail Verbitsky
(74) *Attorney, Agent, or Firm*—Edward P. Dutkiewicz

(57) ABSTRACT

A tape measure system includes a tape of a disposable material with limited extensibility. The tape has a short leading edge and a parallel short trailing edge. The tape has long parallel side edges between the leading and trailing edges. The tape has a front face and a rear face. Indicia is formed on the front face and includes continuing indicia along the entire length thereof and repeating indicia along at least one side edge laterally space from the continuing indicia. A strengthening component is formed continuously along the length of the tape and fabricated of an essentially inextensible material.

1 Claim, 3 Drawing Sheets

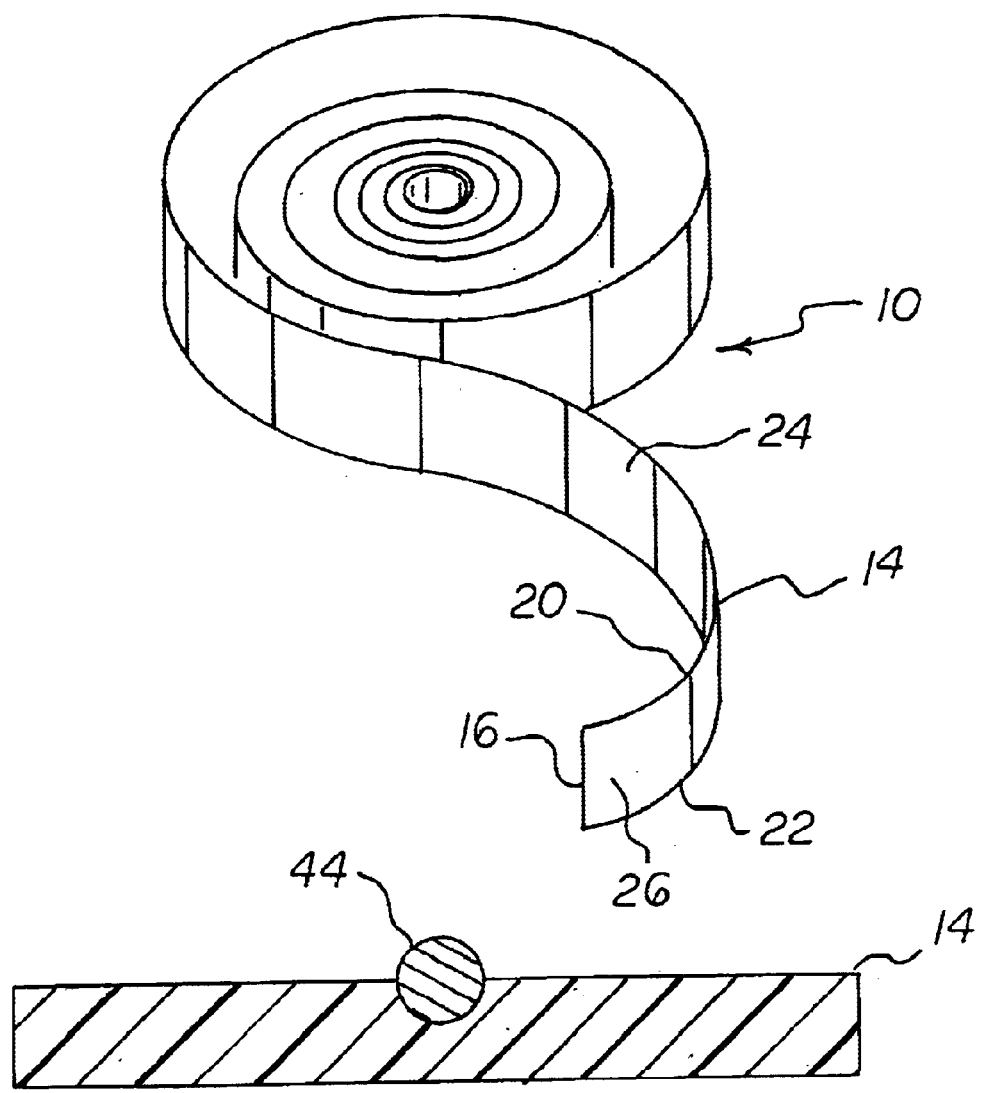
FIG 1
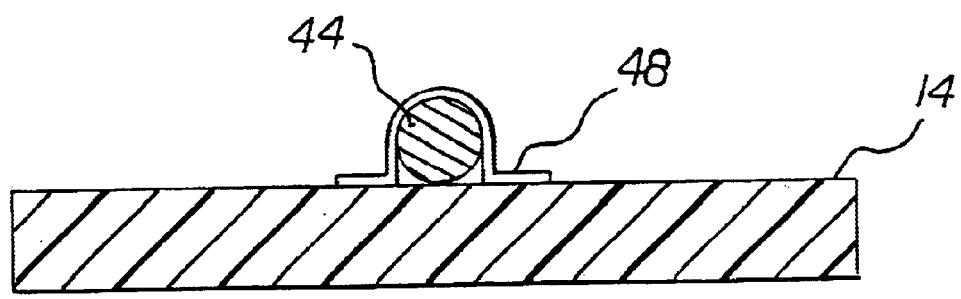
FIG 3
FIG 4

DISPOSABLE TAPE MEASURE SYSTEM

BACKGROUND OF THE INVENTION

1. Field of the Invention

The present invention relates to a disposable tape measure system and more particularly pertains to providing both continuing and repeating indicia on one face of an essentially inextensible but disposable tape measure system.

2. Description of the Prior Art

The use of tape measure systems of known designs and configurations is known in the prior art. More specifically, tape measure systems of known designs and configurations previously devised and utilized for the purpose of providing indicia to tape measure systems to accomplish various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,849,886 to Weyrick et al. discloses a tape measure for measuring and recording the dimensions of a person's body. U.S. Pat. No. 4,149,320 to Troyer et al discloses a building construction measuring tape. U.S. Pat. No. 4,351,113 to Eggertsen et al discloses a pressure sensitive adhesively backed disposable measuring tape and method of manufacture. Lastly, U.S. Pat. No. 5,452,523 to Jansen discloses measuring material lengths.

While these devices fulfill their respective, particular objectives and requirements, the aforementioned patents do not describe disposable tape measure system that allows providing both continuing and repeating indicia on one face of an essentially inextensible but disposable tape measure system.

In this respect, the disposable tape measure system according to the present invention substantially departs from the conventional concepts and designs of the prior art, and in doing so provides an apparatus primarily developed for the purpose of providing both continuing and repeating indicia on one face of an essentially inextensible but disposable tape measure system.

Therefore, it can be appreciated that there exists a continuing need for a new and improved disposable tape measure system which can be used for providing both continuing and repeating indicia on one face of an essentially inextensible but disposable tape measure system. In this regard, the present invention substantially fulfills this need.

SUMMARY OF THE INVENTION

In view of the foregoing disadvantages inherent in the known types of tape measure systems of known designs and configurations now present in the prior art, the present invention provides an improved disposable tape measure system. As such, the general purpose of the present invention, which will be described subsequently in greater detail, is to provide a new and improved disposable tape measure system and method which has all the advantages of the prior art and none of the disadvantages.

To attain this, the present invention essentially comprises a new and improved tape measure system adapted to be cut on site for a particular construction application with both continuing and repeating indicia and a strengthening component along the length of the tape. A tape of a disposable material with limited extensibility is selected from the class of disposable materials with limited extensibility including paper, cloth, and plastic, such as Mylar, polyvinyl chloride (PVC), and polyethylene (PE). The tape has a short leading edge and a parallel short trailing edge. The tape also has long parallel side edges between the leading edge and trailing edge. The tape has an extended length of about 200 feet and a width of about 3 inches. The tape is adapted to be spooled upon itself when in a stored orientation and extended linearly by the pulling of the leading edge when in an operative orientation. The tape has a front face and a rear face. The tape has a thickness of about 1 mil. Indicia is formed on the front face and includes continuing indicia along the entire length thereof midway of the side edges formed of heavy marking lines and foot numerals indicative of measured feet every 12 inches and light marking lines indicative of measured inches each inch between the heavy marking lines. The indicia also includes repeating indicia along each side edge laterally spaced from the continuing indicia with the repeating indicia along one edge being spaced at different distances from the repeating indicia along the opposite edge. A strengthening component formed of a continuous thread with a diameter of about 1 mil is provided. The thread is fabricated of an essentially inextensible material of the class of essentially inextensible materials including cotton and a monofilament nylon. The thread is secured to the front face of the tape along the entire extent. In this manner the leading edge may be attached to an area being measured and extended in linear fashion to a second location where it is attached again with the secured portion being then cut from the remainder of the tape in the spool.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disposable tape measure system which has all of the advantages of the prior art tape measure systems of known designs and configurations and none of the disadvantages.

It is another object of the present invention to provide a new and improved disposable tape measure system which may be easily and efficiently manufactured and marketed.

It is further object of the present invention to provide a new and improved disposable tape measure system which is of durable and reliable constructions.

An even further object of the present invention is to provide a new and improved disposable tape measure system which is susceptible of a low cost of manufacture with regard to both materials and labor, and which accordingly is then susceptible of low prices of sale to the consuming public, thereby making such disposable tape measure system economically available to the buying public.

Even still another object of the present invention is to provide a disposable tape measure system for providing both continuing and repeating indicia on one face of an essentially inextensible but disposable tape measure system.

Lastly, it is an object of the present invention to provide a new and improved tape measure system including a tape of a disposable material with limited extensibility. The tape has a short leading edge and a parallel short trailing edge. The tape has long parallel side edges between the leading and trailing edges. The tape has a front face and a rear face. Indicia is formed on the front face and includes continuing indicia along the entire length thereof and repeating indicia along at least one side edge laterally space from the continuing indicia. A strengthening component is formed continuously along the length of the tape and fabricated of an essentially inextensible material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the new and improved disposable tape measure system constructed in accordance with the principles of the present invention, the tape measure system being oriented in the rolled configuration for the majority of its extent.

FIG. 3 is a cross-sectional view of the tape shown in the prior Figures taken along line 3—3 of FIG. 2.

FIG. 4 is a cross-sectional view of an alternate embodiment of the invention.

The same reference numerals refer to the same parts throughout the various Figures.

DESCRIPTION OF THE PREFERRED EMBODIMENT

Figures 2, 5:
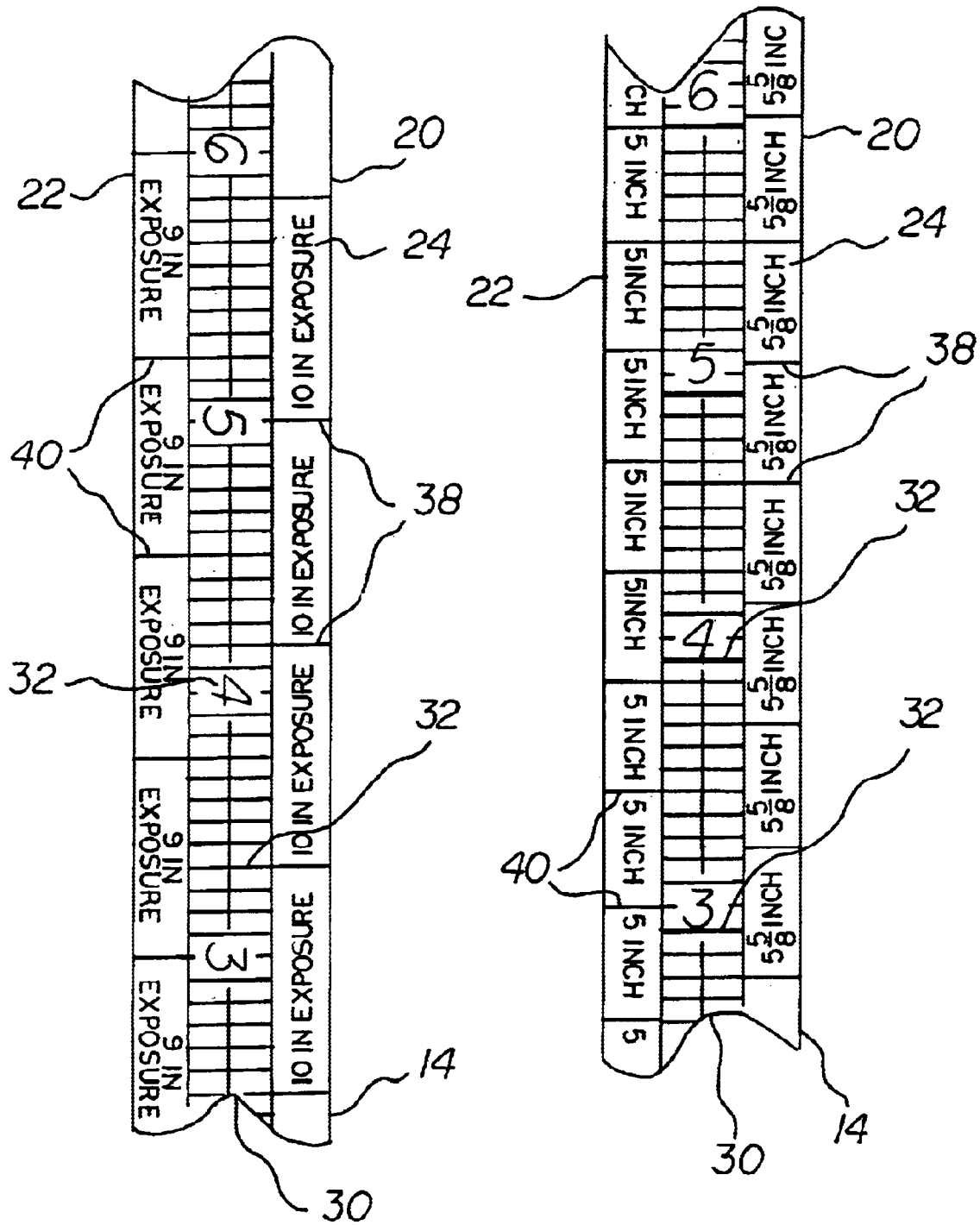
FIG. 2 is an elevational view of the front face of the tape shown in FIG. 1.
FIG. 5 is a front elevational view of an alternate embodiment of the invention.

With reference now to the drawings, and in particular to FIG. 1 thereof, the preferred embodiment of the new and improved disposable tape measure system embodying the principles and concepts of the present invention and generally designated by the reference numeral 10 will be described.

The present invention, the disposable tape measure system 10 is comprised of a plurality of components. Such components in their broadest context include a tape, indicia, and a strengthening component. Such components are individually configured and correlated with respect to each other so as to attain the desired objective.

The tape measure system 10 is adapted to be cut on site for a particular construction application with both continuing and repeating indicia and a strengthening component along the length of the tape. First provided is a tape 14 of a disposable material with limited extensibility is selected from the class of disposable materials with limited extensibility including paper, cloth, and plastic, such as Mylar, polyvinyl chloride (PVC), and polyethylene (PE). The tape has a short leading edge 16 and a parallel short trailing edge 18. The tape also has long parallel side edges 20, 22 between the leading edge and trailing edge. The tape has an extended length of about 200 feet and a width of about 3 inches. The tape is adapted to be spooled upon itself when in a stored orientation and extended linearly by the pulling of the leading edge when in an operative orientation. The tape has a front face 24 and a rear face 26. The tape has a thickness of about 1 mil.

Indicia is provided. The indicia is formed on the front face and includes continuing indicia 30 along the entire length thereof midway of the side edges formed of heavy marking lines 32 and foot numerals 34 indicative of measured feet every 12 inches and light marking lines 36 indicative of measured inches each inch between the heavy marking lines. The indicia also includes repeating indicia 38, 40 along each side edge laterally spaced from the continuing indicia with the repeating indicia 38 along one edge being spaced at different distances from the repeating indicia 40 along the opposite edge.

Lastly provided is a strengthening component 44 formed of a continuous thread with a diameter of about 1 mil. The thread is fabricated of an essentially inextensible material of the class of essentially inextensible materials including cotton and a monofilament nylon. The thread is secured to the front face of the tape along the entire extent. In this manner the leading edge may be attached to an area being measured and extended in linear fashion to a second location where it is attached again with the secured portion being then cut from the remainder of the tape in the spool.

Figure 9:
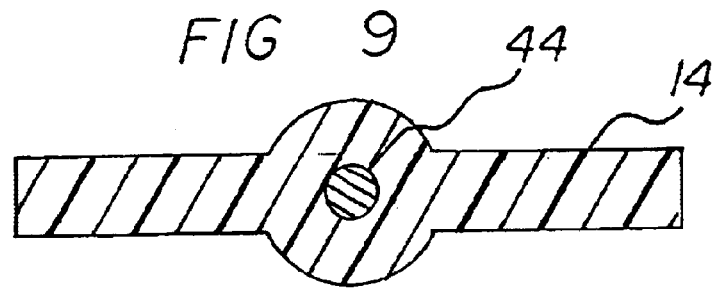
Figure 10:
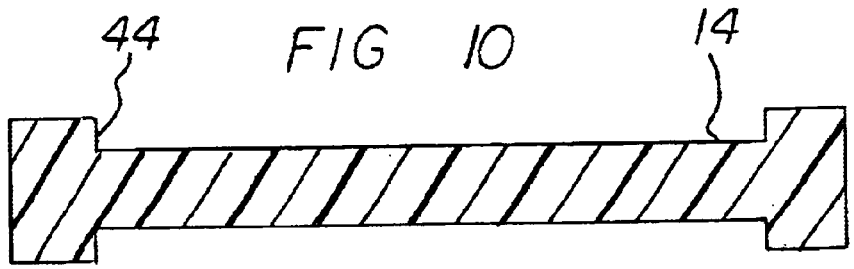

An alternate embodiment is shown in FIGS. 9 and 10. In this embodiment the repeating indicia are spaced 9 inches along one edge and 10 inches along the other edge.

Yet another alternate embodiment of the system is shown in FIG. 5 wherein the repeating indicia are spaced at 5 inches along one edge and 5⅝ inches along the other edge.

In still another alternate embodiment of the system the indicia is on both faces of the tape. Note FIG. 1.

In FIG. 3 a further alternate embodiment is shown. In this embodiment the strengthening component is a thread formed into one face of the tape.

In still another embodiment, the strengthening component may be a thread with a tape 48 securing the thread to one surface of the tape. Note FIG. 4.

In still another embodiment, the thread may be formed interiorly of the tape. This embodiment is shown in FIG. 9.

Figure 8:
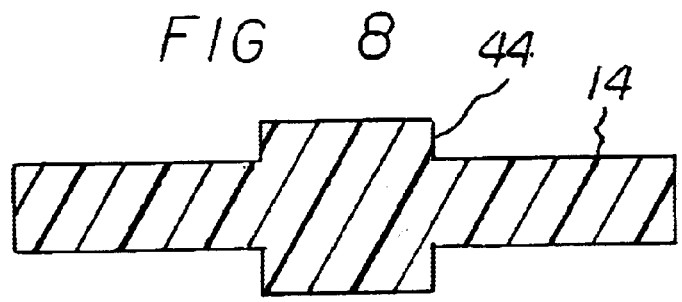

Yet another embodiment of the system is shown in FIG. 8 wherein the strengthening component is a thickened region formed in the faces of the tape.

FIGS. 3, 4, 8 and 9 show yet another embodiment of the system. In this embodimdent the strengthening component is a single component extending longitudinally along the center of the tape parallel with the side edges.

Figure 6:
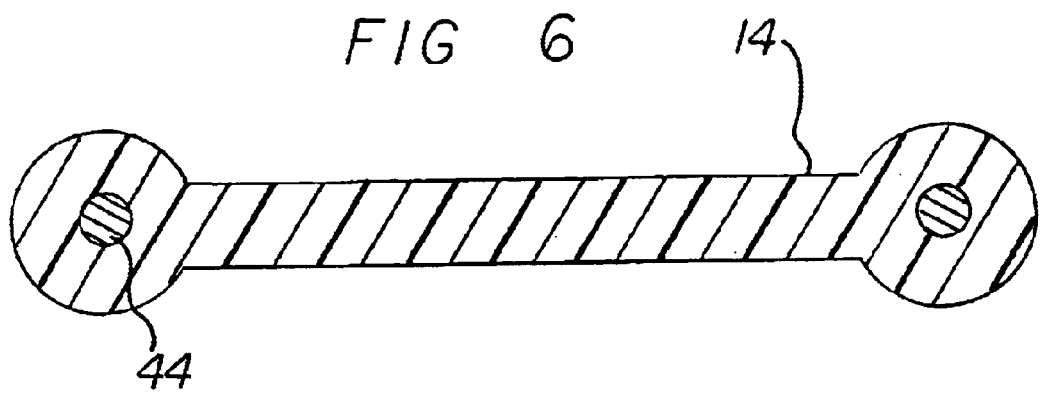
FIGS. 6 through 10 are cross-sectional views of further alternate embodiments of the invention.
Figure 7:
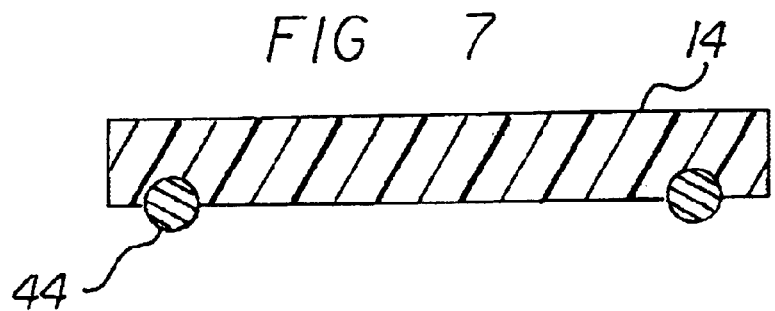

In a final embodiment of the invention, the strengthening component may be a pair of components located in parallel relationship along the side edges of the tape. Note FIGS. 6, 7 and 10.

In the construction industry measurements are a common and necessary practice of skilled craftsmen. The ability to measure precisely, creating products or performing services based on the measurements, is a primary skill of a craftsman. There are situations where measurements are used to perform alignment so that an edge between two measures can be kept straight. In these situations all that is required are calibrated scales that can be permanently attached to the structure being built. No transfer of measures is necessary.

For example, roofing shingles need to be laid down straight relative to the roof's peak. However, shingles are always laid beginning at the lowest edge of the roof and rise to the roof's peak, row by row. Between the lowest roof edge and its peak can be a distance of many shingles, as for example 50 rows. A skilled roofer has no difficulty laying 50 straight rows of shingles, producing a finished roof that looks as one would expect and desire. An unskilled roofer, such as the home-owner doing his own roof, might not be as adept at shingling a roof. His effort might produce a roof having wavy rows of shingles or rows of shingles that are skewed from top to bottom. To avoid such ain unsightly result, an easy method of measuring and laying down straight lines to follow is necessary.

A disposable tape measure is the solution to this problem. For roofing, the tape would be calibrated in units of shingles. It is unrolled from a 200 foot roll and tacked to the roof on top of the felt or other weather barrier. It is aligned to the lowest edge of the roof and to the peak of the roof. There are two such tapes attached to each flat surface of the roof, one on the right side of the surface, the other on the left side. Being calibrated in shingles, for this example, there are now evenly spaced marks, in units of shingles, rising up each edge of the roof. These marks are used to set the straightness of each new row of shingles. The most obvious method of maintaining row alignment is to lay a chalk line for each new row of shingles as the roofing project progresses toward the roof's peak. The chalked line is stretched between the next observable shingle line on each of the disposable tapes. The chalk line is street hed tight, pulled, and snapped, leaving the desires straight line for the next row of shingles. The next row of shingles is fastened to the roof over the disposable tapes. The thickness of the tape is negligible and will not affect the appearance of the finished roof. No measuring and checking is necessary for each new row of shingles because the rule are attached to the roof and left underneath the new shingles when the job is finished. In this application the job disposes of the tape.

Other applications for disposable tapes can include installing new siding on buildings, marking parking lots, installing fences, laying out flowerbeds, laying tile, hanging pictures, and making bookshelves. Each of these are specific applications with their own measuring systems.

It is the object of this invention to provide an improved method of measurement in places where only relative measures are necessary. Disposable tapes calibrated in units appropriate to each application such as shingles, siding, or parking lot spaces are all that are required. The improvement comes about from the fact that the tape is marked in units of the job being performed. The tape is installed on the surface being worked, eliminating the necessity for repeated measurements eliminates accumulated measurement error, saving the time and material.

Advantages of using measuring tapes marked in units that are appropriate to the job are reduced waste, a clear understanding of the number of rows or spaces that will result, and an aesthetically leasing appearance of the finished job. The tape, being disposable, is left beneath the roof or siding, disposing of it, which is its intent. In parking applications it is simply gathered and disposed of as trash. Current methods of performing these jobs require repeated measurements using tapes calibrated in standard units such as feet or meters, which takes time and careful thought to translate to units suitable to the job at hand.

The disposable tape may be manufactured from any disposable material that can be produced as a flat tape. The current material in popular use today is the bright yellow caution tape or police "crime scene tape." This tape is lightweight, inexpensive, disposable, and easily printed on. Other possible media include paper and cloth tapes. The tape may be of any width and length. The primary feature of the tape is that it is thin enough that it is not aesthetically obtrusive in the finished product.

Industrial versions of the disposable measuring tape are reinforced with a light, strong (50 pounds or more tensile strength) cord molded into the tape. Reinforcing the tape allows it to be used in applications where stretching the tape is likely to be a problem. Roofers for example will pull the tape taut at each end, assuring correct alignment and length before attaching it to the roof.

Home versions of it for applications such as cutting lumber and other small jobs can be ordinary, not reinforced, tape material. These tapes can be stapled or attached with adhesive to the surface being worked and later disposed of as the job permits or requires.

In many applications, the tape will become part of the finished product and will not have any affect on the final appearance of the product such as roof or siding.

The tape may be marked on both the front and back, making it very useful for a wide variety of applications. For example, there are North American roofing shingles and European shingles, among these there are varieties of shingles. A single tape can be produced for roofing shingles and can have calibrated marks for a wide variety of shingles. A siding tape can be marked (both sides)n for a variety of home and industrial sidings. A parking tape can be marked for compact, midsize, and large vehicles. A tape marked like this would allow parking attendants at an event to park all variety of vehicles on a single lot, then simply remove, and dispose of the tape after the event.

The markings are printed on the tape stock in accordance with the application of the tape. The printing is a straightforward process and is a common technology.

The tape may be reinforced along the top edge. This would be the edge of the tape that is pulled taut when a tight tape is required. The reinforcing can be manufactured into the tape and could be a single stand of monofilament line or some other appropriate cord.

A non-reinforced tape would not have a reinforcing cord in it, but it would still be marked for applications where the disposable tape is unlikely to be stretched.

These embodiments of this invention, reinforced and not reinforced, would appear identical to the user. The expected application of the tape is the determining factor for whether or not reinforcing is necessary. For some applications where very precise measurements are required, even more reinforcing may be necessary since the tape could easily be laid into the work without stress and removed later by simply pulling it out. There would be no reinforcing in the tape to pull the work apart by removing the tape.

The tape may be marked on one side in units of the application and adhesive on the other side for attaching to a job where other fasteners would be inappropriate.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A tape measure system comprising:

a tape of a disposable material with limited extensibility, the tape having a short leading edge and a parallel short trailing edge and having long parallel side edges there between including, a first side edge and a second side edge with a central extent there between, the tape having a front face and a rear face; and indicia formed on the front face and consisting of three continuing repeating indicia lines, continuing repeating first indicia lines equally spaced at a first distance along the entire central extent of the tape, the indicia also consisting of continuing repeating second indicia lines along the first side edge laterally spaced from the first indicia lines with the second indicia lines being equally spaced at a second distance different from the first distance, the indicia also consisting of continuing repeating third indicia lines along the second side edge laterally spaced from the first indicia lines and the second indicia lines with the third indicia lines being equally spaced at a third distance different from the first distance and second distance, the first indicia lines and the second indicia lines and the third indicia lines further consisting of at least one common indicia line extending across the entire front face from the first side edge to the second side edge.

* * * * *